US006668246B1

United States Patent
Yeung et al.

(10) Patent No.: US 6,668,246 B1
(45) Date of Patent: Dec. 23, 2003

(54) MULTIMEDIA DATA DELIVERY AND PLAYBACK SYSTEM WITH MULTI-LEVEL CONTENT AND PRIVACY PROTECTION

(75) Inventors: Minerva Ming-Yee Yeung, Sunnyvale, CA (US); Matthew J. Holliman, Libertyville, IL (US); Robert G. Liu, Sunnyvale, CA (US); William W. Macy, Palo Alto, CA (US); Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,905

(22) Filed: Mar. 24, 1999

(51) Int. Cl.[7] .............................................. G06F 17/60
(52) U.S. Cl. ............................ 705/57; 380/211; 705/1; 705/51; 713/150
(58) Field of Search .................................. 380/200, 201, 380/211; 705/1, 50, 51, 52, 54, 57; 713/150

(56) References Cited

U.S. PATENT DOCUMENTS

| 4,933,971 | A | * | 6/1990 | Bestock et al. ............... 380/44 |
| 5,638,448 | A | * | 6/1997 | Nguyen ....................... 380/29 |
| 5,689,566 | A | * | 11/1997 | Nguyen ....................... 713/155 |
| 6,275,939 | B1 | * | 8/2001 | Garrison ..................... 713/200 |
| 6,298,446 | B1 | * | 10/2001 | Schreiber et al. ........... 713/201 |
| 6,304,969 | B1 | * | 10/2001 | Wasserman et al. ........ 713/172 |
| 6,353,892 | B2 | * | 3/2002 | Schreiber et al. ........... 713/201 |

FOREIGN PATENT DOCUMENTS

JP        2000-148689 A   *   5/2000

OTHER PUBLICATIONS

Bobrowski: "Database in a client/server world—Understanding the unique challenges of keeping your client/server database environment secure"; DBMS, Sep. 1, 1994, vol. 7, No. 10, pp. 48–48, (Abstract Only).*

* cited by examiner

*Primary Examiner*—Edward R. Cosimano
(74) *Attorney, Agent, or Firm*—Blakely, Sokoloff, Taylor & Zafman LLP (57) ABSTRACT

A content distribution system comprising a server platform and a client platform. The server platform includes a memory unit to store digital content and access control logic to activate content protection mechanisms that provide multiple levels of access protection to the digital content. In communication with the server platform, the client platform plays back segments of the digital content at one of a plurality of quality levels.

24 Claims, 9 Drawing Sheets

MULTIMEDIA DATA DELIVERY AND PLAYBACK SYSTEM WITH MULTI-LEVEL CONTENT AND PRIVACY PROTECTION

BACKGROUND

1. Field

The present invention relates to the field of data security. More particularly, this invention relates to a platform and corresponding method for protecting content through multiple content control.

2. General Background

For over fifty years, the entertainment industry has provided audio-visual information to the general populous in the form of television programming. When transmitted in an analog format such as National Television Systems Committee (NTSC) or Phase Alternating Line (PAL), this programming is somewhat protected due to the inherent nature of analog signaling. For example, analog signals are troublesome to illicitly copy and redistribute. Also, the recorded copies have poorer image quality than the original programming.

Due to advances in digital processing technology and acceptance of the Internet, digital content distribution is now growing in popularity. Presently, original equipment manufacturers (OEMs) are providing personal computers with open, programmable architectures that are capable of receiving and/or transmitting audio-visual information in a digital format. In many instances, the digitized audio-visual information is encrypted before transmission and decryption upon receipt. Thus, most conventional personal computers only rely on a single content protection mechanism (e.g., encryption and decryption) that either provides programming in full quality or prevents the programming from being displayed. Due to a lack of multiple content protection mechanisms, conventional computers are unable to protect the decrypted, digitized video from being observed by an unauthorized user or manipulated (e.g., copied, altered, etc.) by a malicious program during playback. This has greatly impeded the expansion of digital content distribution.

Therefore, it would be desirable to create a platform and method for protecting digital content through hardware-based identification and a variety of content protection mechanisms to achieve a selected level of access control.

SUMMARY

Briefly, one embodiment of the present invention relates to a content distribution system. The content distribution system comprises a server platform and a client platform. The server platform includes a memory unit to store digital content and access control logic to activate content protection mechanisms that provide multiple levels of access protection to the digital content. In communication with the server platform, the client platform plays back segments of the digital content at one of a plurality of quality levels.

BRIEF DESCRIPTION OF THE DRAWINGS

The features and advantages of the present invention will become apparent from the following detailed description of the present invention in which.

DETAILED DESCRIPTION

The present invention relates to a platform and corresponding method to protect content from unauthorized observation and/or manipulation through hardware-based identification and a variety of content protection mechanisms. Selected combinations of content protection mechanisms combined with hardware-based identification can provide different levels of access control. Each level of access control is associated with a unique degree of protection against unauthorized observation and/or manipulation of content. Hence, each level of access control comprises: one or more authentication checks of a client identifier and/or auxiliary information associated with the content purchaser; content transformation and distortion; and possibly extraction of meta-data from delivered content.

It should be apparent that certain embodiments are described in order to provide a thorough understanding of the invention; however, these embodiments should be construed as illustrative in nature, not restrictive. Also, well-known logic is not set forth in detail in order to avoid unnecessarily obscuring the present invention.

In the following description, certain terminology is used to describe characteristics of the present invention as well as cryptographic functionality. For example, a "platform" comprises an electronic device including a processor (e.g., a microprocessor, a microcontroller, a state machine, etc.) and a communication device to transmit and/or receive content. Examples of a platform include, but are not limited or restricted to a computer (e.g., a laptop, desktop, hand-held, mainframe, etc.), communication equipment (e.g., telephone, telephone with video display, etc.), or a set-top box (e.g., cable box, network computer, etc.).

"Content" is generally defined as (i) data in the form of video, images, audio, text, programs or any combination thereof, and/or (ii) control information such as Internet Protocol (IP) commands, identifiers and the like. The term "quality" is a measure of the visual clarity of an image or video, audible clarity during audio playback, accuracy of characters in text or programs as well as other factors. Content is considered "full quality" when its visual or audible clarity is substantially the same as its original (master) form even though the underlining data may be different. Content is considered "lesser quality" when its visual or audible clarity is substantially inferior to the original form.

Additionally, a "communication link" is defined as one or more mediums to transfer content from one location to another. Examples of a communication link include, but are not limited or restricted to electrical wire, fiber optic, cable, wireless channel(s) established using infrared (IR) or radio frequency (RF) signaling, a private local area network, a wide area network or even the Internet. A "mechanism" includes a particular functionality performed through execution of software and/or operation of hardware.

With respect to cryptographic functionality, a "key" is information used by a cryptographic function (e.g., symmetric function) for encryption and/or decryption. Herein, each key is sized to be 160-bits in length, although any bit size may be used. A "one-way hash function" converts content from a variable-length into a fixed-length with no ability to recover the variable-length content. Examples of a one-way hash function include a Secure Hash Algorithm (SHA-1) as specified a 1995 publication entitled *Secure Hash Standard FIPS* 180-1 (Apr. 17, 1995). The term "secure" (and any other tense or form thereof) indicates a state where it is virtually computationally infeasible for an unauthorized individual to gain access to content or other data in a plain text format.

Figure 1:
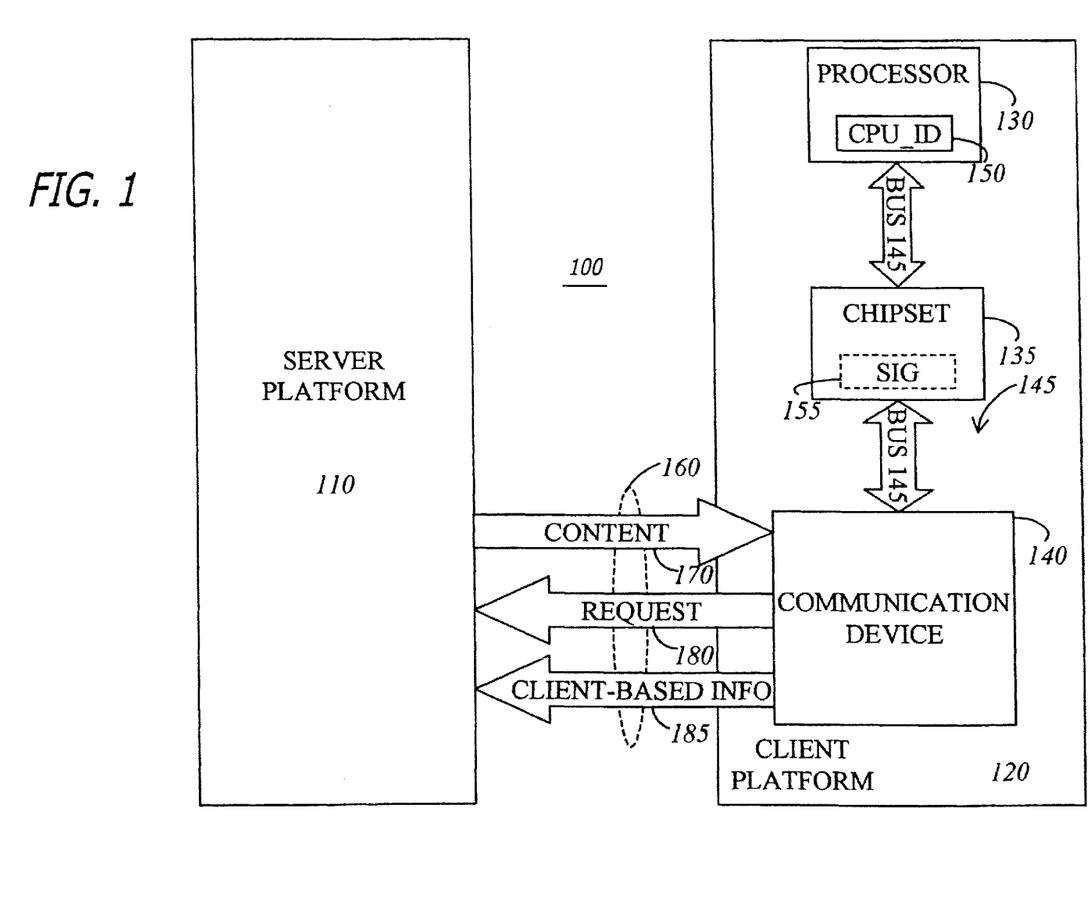
FIG. 1 is an illustrative block diagram of a first embodiment of a content distribution system.

Referring to FIG. 1, an illustrative block diagram of a first embodiment of a content distribution system 100 is shown. In this embodiment, content distribution system 100 comprises a server platform 110 and a client platform 120. Client platform 120 comprises a processor 130, a chipset 135, and a communication device 140 (e.g., a modem card, network interface card, etc.) coupled together through buses 145. As shown in this embodiment, processor 130 is assigned a serial number (referred to as a "CPU_ID") 150. CPU_ID 150 is unique or at least sufficiently unique to act as an identifier to distinguish client platform 120 from other platforms (hereinafter referred to as a "client identifier").

It is contemplated that the client identifier may be extracted from different components or provided in different formats. For example, the client identifier can be extracted from a combination of components to provide a sufficiently unique identification of client platform 120. These components include one or more of the following: processor 130, chipset 135, communication device 140, and/or a hard disk drive. Also, as an alternative format represented by dashed lines, the client identifier may be a secure platform signature 155 in accordance with any recognized digital signature standard. Secure platform signature 155 may be implemented in chipset 135 as shown.

Referring still to FIG. 1, platforms 110 and 120 are coupled together through a bidirectional communication link 160 that enables content 170 to be securely delivered to client platform 120. Content 170 is delivered to client platform 120 via communication link 160 either (1) when a continuous connection is established and maintained with server platform 110, or (2) during periodic connections with server platform 110. The later delivery technique allows server platform 110 to perform repeated authentication checks on client platform 120.

One embodiment of an authentication check involves server platform 110 comparing the client identifier of client platform 120 (e.g., CPU_ID 150 or secure platform signature 155) with pre-stored identifiers associated with devices that have been authorized to retrieve content from server platform 110. To enhance security, it is contemplated that server platform 110 may store hash values of authorized client identifiers. As a result, for the CPU_ID implementation, the client identifier of client platform 120 would have to undergo a one-way hash function prior to comparison. For the secure platform signature implementation, data associated with the signature could be recovered and compared with the pre-stored hash values. Of course, in lieu of client identifiers, authentication checks may be performed on user information (e.g., passwords, assigned recipient identification values, etc.) or even a software-based magic cookie.

In the event that an authentication check fails, all segments of content 170 scheduled for playback at client platform 120 (whether already delivered or not) would fail to play or cannot be played at "full quality" until a subsequent authentication check is successful. This periodic content delivery technique constitutes an additional level of access control.

In general, client platform 120 issues a request 180 for content from server platform 110 via communication link 160. Content request 180 is accompanied by client-based information 185 needed by server platform 110 to identify the specific content ordered and to verify whether client platform 120 and/or an intended recipient is authorized to receive that content. In one embodiment, this client-based information 185 comprises (1) a client identifier, (2) order information to identify the content ordered by the content purchaser, (3) optional auxiliary information such as a recipient identifier (REC_ID) to identify the intended recipient of the ordered content, or any combination thereof In many instances, REC_ID identifies the content purchaser. Of course, in lieu of or in addition to REC_ID, it is contemplated that other parameters could be used as auxiliary information to identify the content purchaser such as an account number, a password, a birth date, a social security number, digitized biometric characteristics of the content purchaser and the like.

For this embodiment, a selected protection level is computed by server platform 110 based on client-based information 185 provided with content request 180. This "protection level" indicates what level of access control is desired, namely which authentication checks and/or content protection mechanisms (e.g., watermark insertion, visual/perceptual scrambling, data scrambling, etc.) are to be performed on content delivered to client platform 120.

Figure 2:
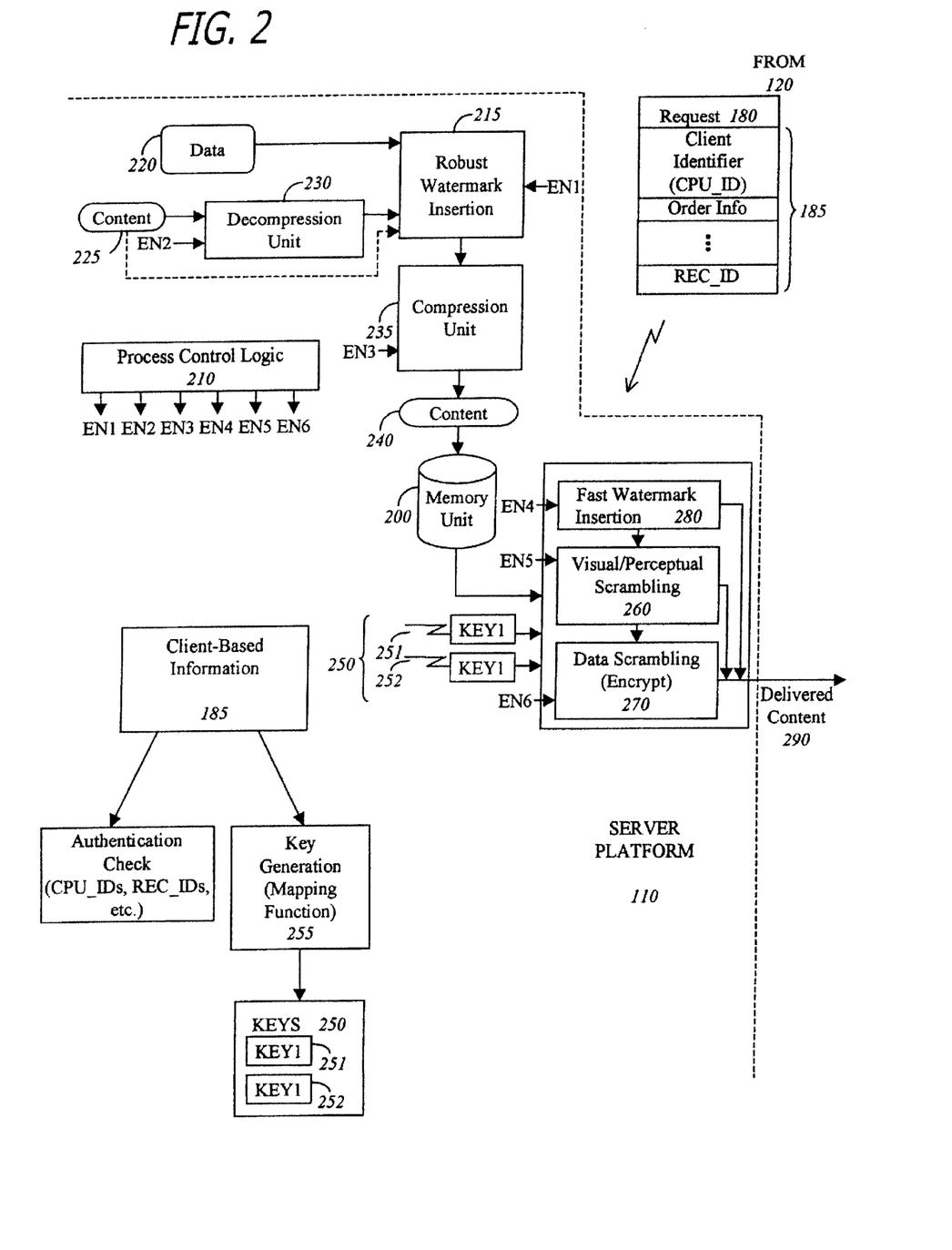
FIG. 2 is an illustrative block diagram of an embodiment of a server platform of the content distribution system of FIG. 1.

Referring now to FIG. 2, an illustrative block diagram of an embodiment of server platform 110 is shown. In this embodiment, server platform 110 comprises a memory unit 200 for content storage and access control logic 210. In particular, access control logic 210 includes hardware and/or software that activates one or more content protection mechanisms based on a desired level of access control. These content protection mechanisms tailor delivered content for playback on a particular client platform.

Herein, certain content protection mechanisms are performed on the content before receipt of a content request from a client platform. This is due to the fact that certain operations are not dependent on the particular identity of the content purchaser. Of course, it is contemplated that all content protection mechanisms may be performed after receipt of the content request, provided significant latency is not realized from either robust watermark insertion or data compression.

As shown in FIG. 2, a first content protection mechanism 215 performs robust watermark insertion by embedding data 220 into content 225. Data 220 may be embedded into content 225 an unobtrusive way so that the quality of content is not reduced and subsequently extracted for analysis. As shown, data 220 includes meta-data that, when extracted, provides information about content 225. Examples of meta-data include information about the creator of content 225, a creation date of content 225, the current owner of content 225, a standard copyright notice and the like. Of course, data 220 is not required to be meta-data.

To support watermarking in a spatial domain, access control logic 210 may signal a decompression unit 230 to decompress content 225 before data 220 is embedded. Thereafter, if desired, the decompressed, watermarked content may be loaded into a compression unit 235 before storage of content 240 in memory unit 200. Normally, compression is performed to preserve bandwidth, to improve transfer rates and to reduce the amount of required storage space. Herein, a Moving Picture Experts Group (MPEG) compression function may be used when content 225 is video. In this embodiment, either the MPEG-1 standard set forth in a publication entitled "Coding of Moving Pictures and Associated Audio for Digital Storage Media up to 1.5 megabits/second," ISO/IEC JTC 1 CD 11172 (1992) or the MPEG-2 standard set forth in a publication entitled "Generic Coding of Moving Pictures and Associated Audio," ISO/IEC JTC 1 CD 13818 (1994) may be used. Of course, other types of compression functions may be used, such as Joint Photographic Experts Group (JPEG) when content 225 is a still image. JPEG is defined in a publication authored by William B. Pennebaker and Joan L. Mitchell entitled "JPEG: Still Image Compression," Van Nostrand Reinhold, N.Y.

It is contemplated, however, that digital content distribution may involve the transmission of uncompressed content. In this situation, compression unit 235 and perhaps decompression unit 230 could be removed from server platform 110. Also, when performed in a compressed domain, robust watermark insertion occurs when the content is in a compressed state, not in a decompressed state in accordance with the illustrative embodiment in FIG. 2.

Upon receiving content request 180 and accompanying client-based information 185, server platform 110 performs an authentication check to verify that the client platform and/or content purchaser requesting content is authorized to obtain this content. This authentication check is performed in accordance with any number of schemes. For example, the incoming client identifier (or its resultant hash value) may be compared with a list of client identifiers (or their corresponding hash values) authorized to receive delivered content. Likewise, auxiliary information may be used to determine whether the content purchaser has access to content loaded on server platform 120.

In the situation where client platform 120 of FIG. 1 is the requesting client platform, CPU_ID 150 (or its hash result) may be provided to server platform 120 and compared with a list of CPU_IDs (or corresponding hash results). Likewise, REC_ID may be provided to server platform 120 and compared with each entry associated with a list of registered users having access to content loaded on server platform 120.

After the requesting client platform has been authenticated, one or more keys 250 are generated and accessible by selected content protection mechanisms such as visual/perceptual scrambling and/or data scrambling of content 240. Key(s) 250 may include either a single key when both visual/perceptual scrambling and data scrambling are performed in combination, or multiple keys 251 and 252 (as shown) when these scrambling techniques may be conducted in the alternative.

For an embodiment where visual/perceptual scrambling and data scrambling can be performed in the alternative, keys 251 and 252 are produced by inputting selected client-based information into a mapping function 255. Thus, keys 251 and 252 are variant transformations of the selected client-based information. For example, in one embodiment, keys 251 and 252 are mappings of the CPU_ID and REC_ID of the requesting client platform. Another example is that keys 251 and 252 are transformations of CPU_ID and the concatenated sum of CPU_ID and some auxiliary information (e.g., a password, account number, etc.) provided by the requesting client platform, respectively. Still another example is that keys 251 and 252 are transformations of REC_ID and a hash result of CPU_ID, respectively. It is clear that keys 251 and 252 are transformations of data or portions thereof of client-based information 185.

Depending on the selected level of access control, at least a portion of content 240 may undergo visual/perceptual scrambling, data scrambling, or both types of scrambling schemes. Performed by a second content protection mechanism 260, visual/perceptual scrambling involves the intentional degradation of the quality of content 240 to such a degree that it is substantially inferior to the quality of content 240 before scrambling. In video, for example, this is accomplished by intentionally altering the signal values associated with various portions of each digital image frame. Normally, the degradation is reversible so that content 240 can be recovered.

A third content protection mechanism 270 performs data scrambling (or encrypting) operations on input content. Data scrambling requires the use of a scrambling (or cryptographic) function and one or more keys (e.g., key 252). Upon performing data scrambling, the substance and nature of content 240 or the visually or perceptually degraded content supplied after performing visual/perceptual scrambling of content 240 is effectively conceals, unless the recipient has access to an identical copy of the scrambling (or cryptographic) function and key 252. The visual/perceptual scrambling and data scrambling (encrypting) operations can be performed "simultaneously" on content 240 as well as by sequential operations in their entirety.

After one or both of the scrambling schemes has been performed, the resultant content 290 (encrypted and/or visually or perceptually distorted) is delivered over a secure communication link such that no eavesdroppers can reliably recover the original video in its digital form.

Optionally, prior to degrading to quality of content 240 to produce deliverable content 290, a fourth content protection mechanism 280 performs a fast watermark insertion scheme by embedding data that identifies the targeted recipient (e.g., REC_ID) of deliverable content 290. Normally, this is referred to as "fingerprinting". When used, the insertion of REC_ID provides an ownership attribution associated with content 290 (e.g., an indication of all recipients of content 290). This allows content providers to uncover parties responsible for unauthorized, subsequent usage of content 290. The chain of ownership attribution achieved by repeated insertion of REC_ID may help establish an audit trail of content 290.

Figure 3:
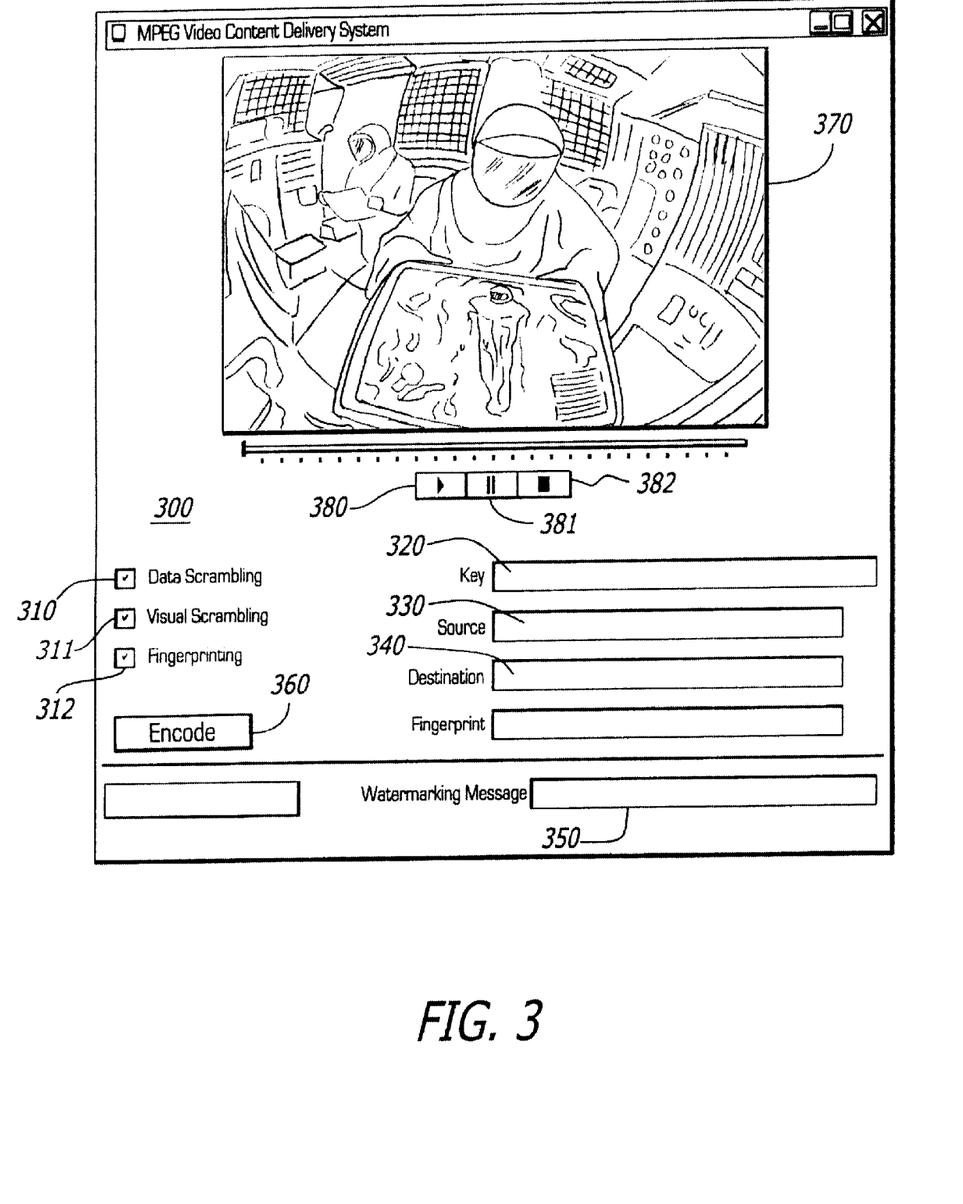
FIG. 3 is an embodiment of a screen menu produced at the server platform for selecting the origin of the content and the level of access control based on the selected content protection mechanisms.

Referring to FIG. 3, an illustrative embodiment of a window 300 produced at server platform 110 which allows the content provider to select the content provided and the level of access control (degree of protection applied to the content). As shown, window 300 includes a plurality of option grids 310–312 associated with data scrambling, visual scrambling or fingerprinting. When selected by the content provider, grids 310–312 signal access control logic of server platform which content control mechanisms are to be selected.

In addition to grids 310–312, window 300 includes a key entry grid 320, a source grid 330, a destination grid 340, a watermarking message grid 350 and an encode button 360. Key entry grid 320 allows the content provider to enter an alphanumeric key (e.g., user passwords, user account information, etc.). Source grid 330 allows the content provider to enter a storage location (e.g., file name) where the content is currently stored in memory unit 200. Destination grid 340 allows the content provider to select where the secure content is stored and subsequently transmitted. Watermarking message grid 350 allows the content provider to embed text data into the content. Encode button 360 is selected to performing data scrambling, visual scrambling, and/or watermarking on content associated with source grid 330.

It is contemplated that the information displayed in grids 320, 330, 340 and 350 (e.g., key, storage location, destination and text data for watermarking) do not need to be displayed. They can be performed in a module that automatically processes the content with each request of content that gained authorization.

When the content is video, a playback window 370 may be provided to allow the content provider to review the content prior to undergoing selected data scrambling, visual scrambling, and/or watermarking schemes. The review is controlled through a play, pause and stop buttons 380–382 displayed below playback window 370.

Figure 4:
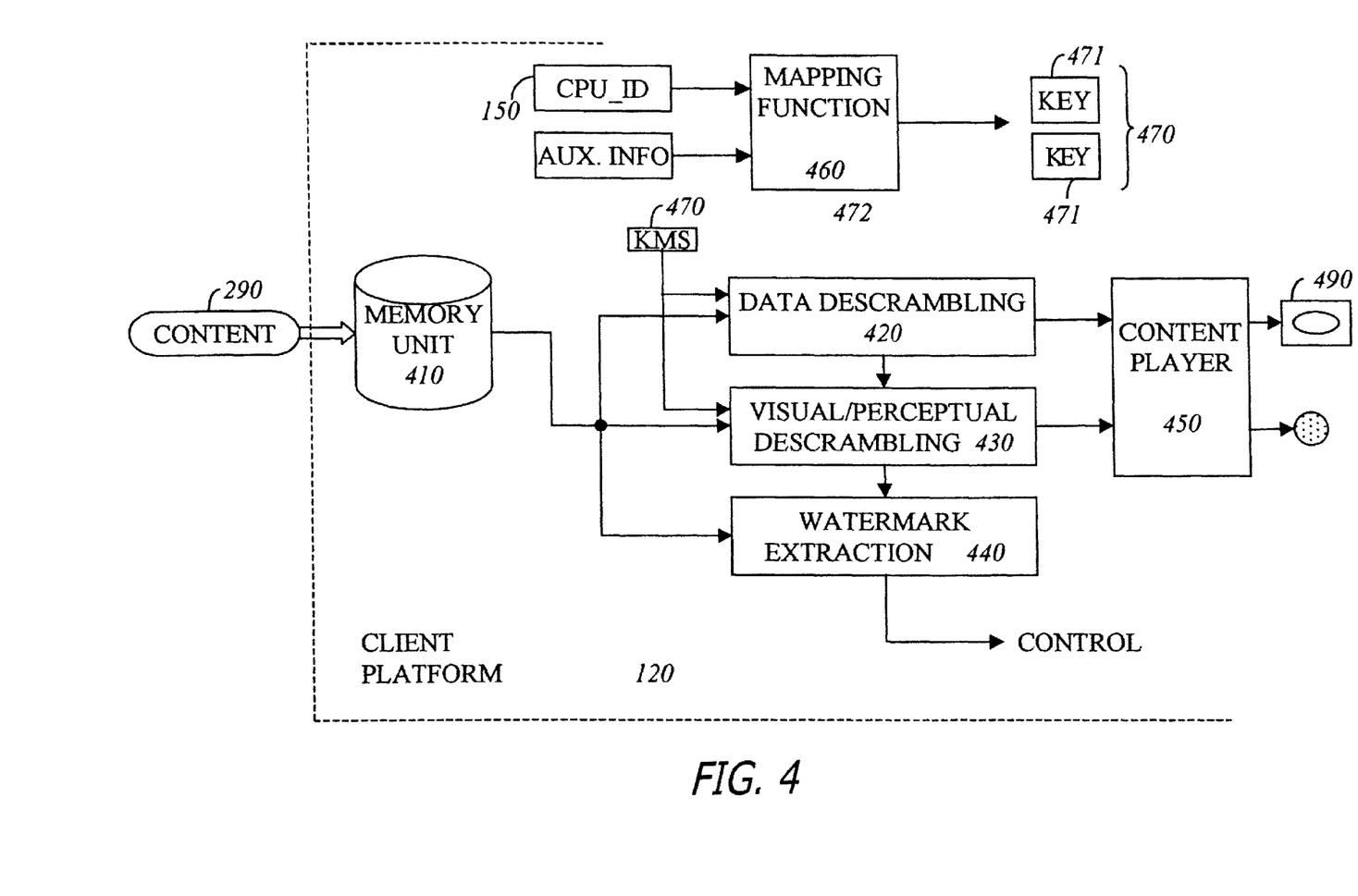
FIG. 4 is an illustrative block diagram of an embodiment of a client platform of the content distribution system of FIG. 1.

Referring to FIG. 4, an illustrative block diagram of an embodiment of a client platform 120 is shown. Upon delivery, content 290 is stored in a memory unit 410. After being delivered in its entirety or in part during content streaming, client platform 120 fetches its client identifier and/or other auxiliary information and attempts to replicate key(s) produced at server platform 110. The degree of successful replication of key(s) controls the level of access to delivered content 290.

More specifically, in one embodiment, content 290 is provided from memory unit 410, in the form of data blocks, to content protection mechanisms 420, 430, 440 performing a data descrambling scheme, a visual/perceptual descrambling scheme and an optional watermark extraction scheme on the data blocks supplied. The performance of one or more of these schemes 420, 430 and 440 provides a greater degree of content protection. Also, it provides multiple quality levels at which content can be played back. The selection of which schemes to perform is based on an authorization level of client platform and/or its user.

As shown, before providing content 290 to a content player 450 for playback, CPU_ID 150 (or secure platform signature 155) of client platform 120 and/or selected auxiliary information are fetched and input into a mapping function 460 in an attempt to produce a copy of key(s) 250 that were used by data scrambling mechanism 260 and visual/perceptual scrambling mechanism 270 of server platform 110 (see FIG. 2). Hence, mapping function 460 is identical to mapping function 270 operating on server platform 110 of FIG. 2. Based on selected transformations of mapping function 460, one or more keys are provided to both data descrambling mechanism 420 and visual/perceptual descrambling mechanism 430.

Figure 5:
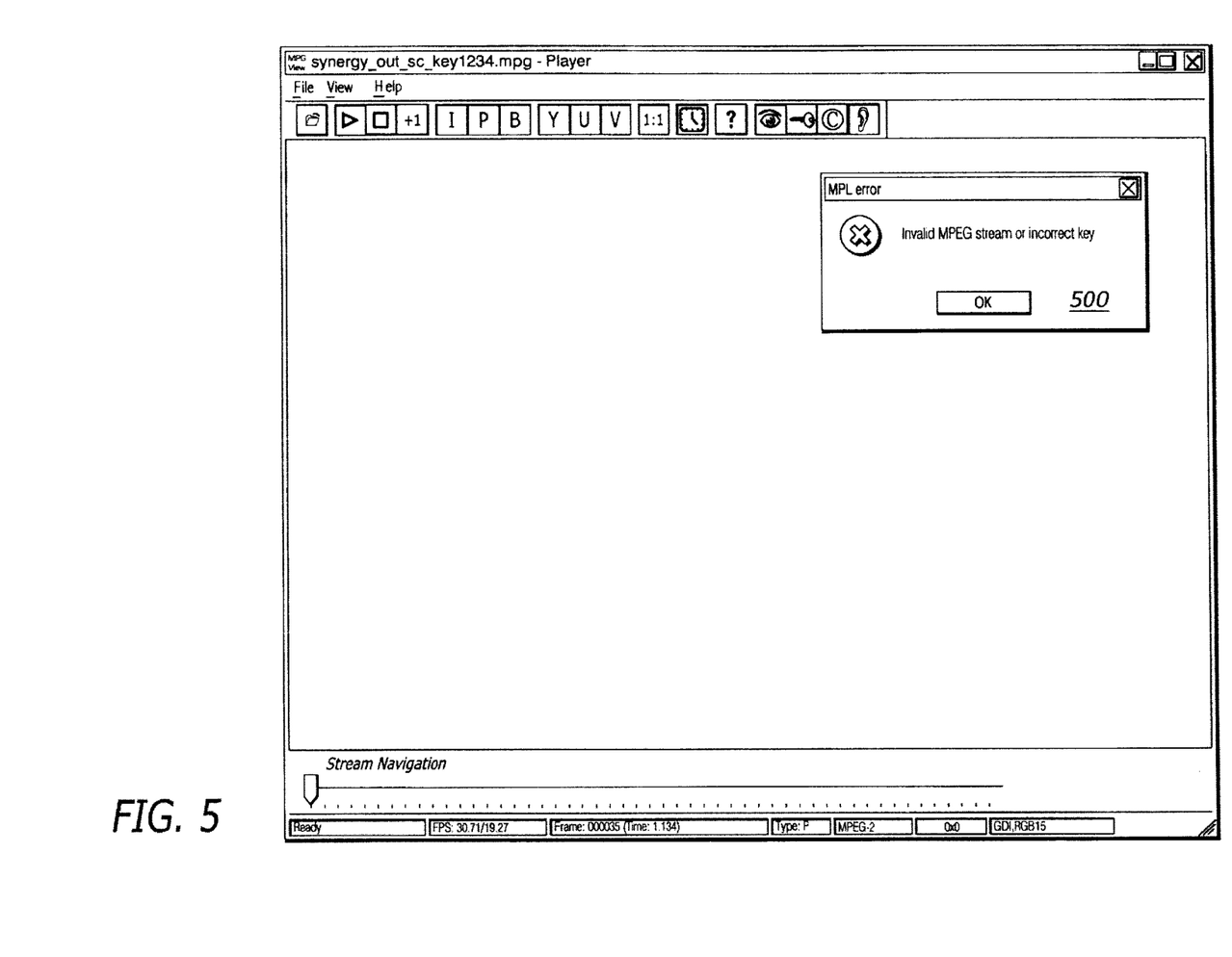
FIG. 5 is an embodiment of a screen display produced by the client platform of FIG. 4 when the content client platform is unable to pass a first level of access control.
Figure 6:
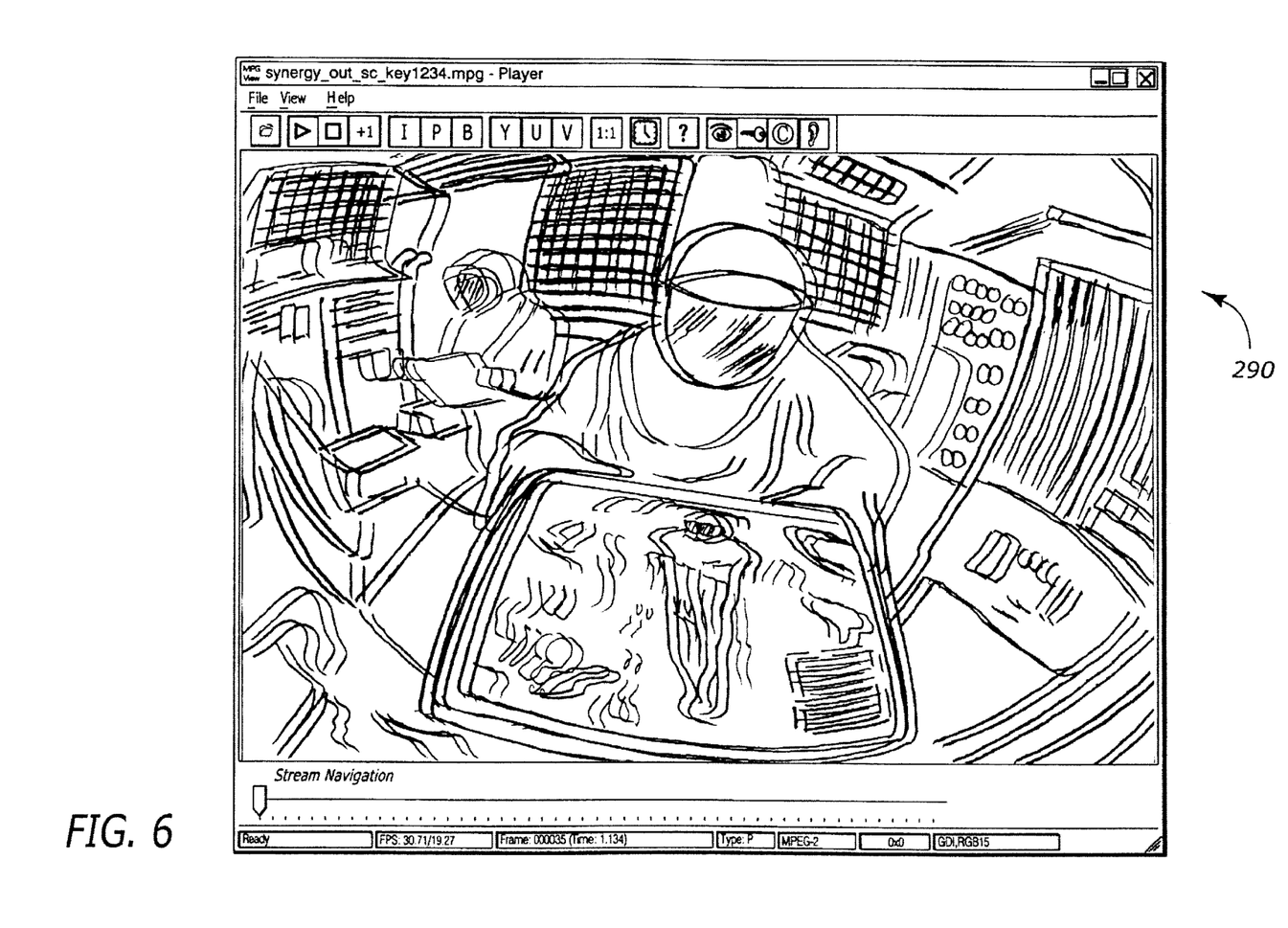
FIG. 6 is an embodiment of a screen display featuring degraded digital content produced by the client platform of FIG. 4 when the client platform is unable to pass a second level of access control.
Figure 7:
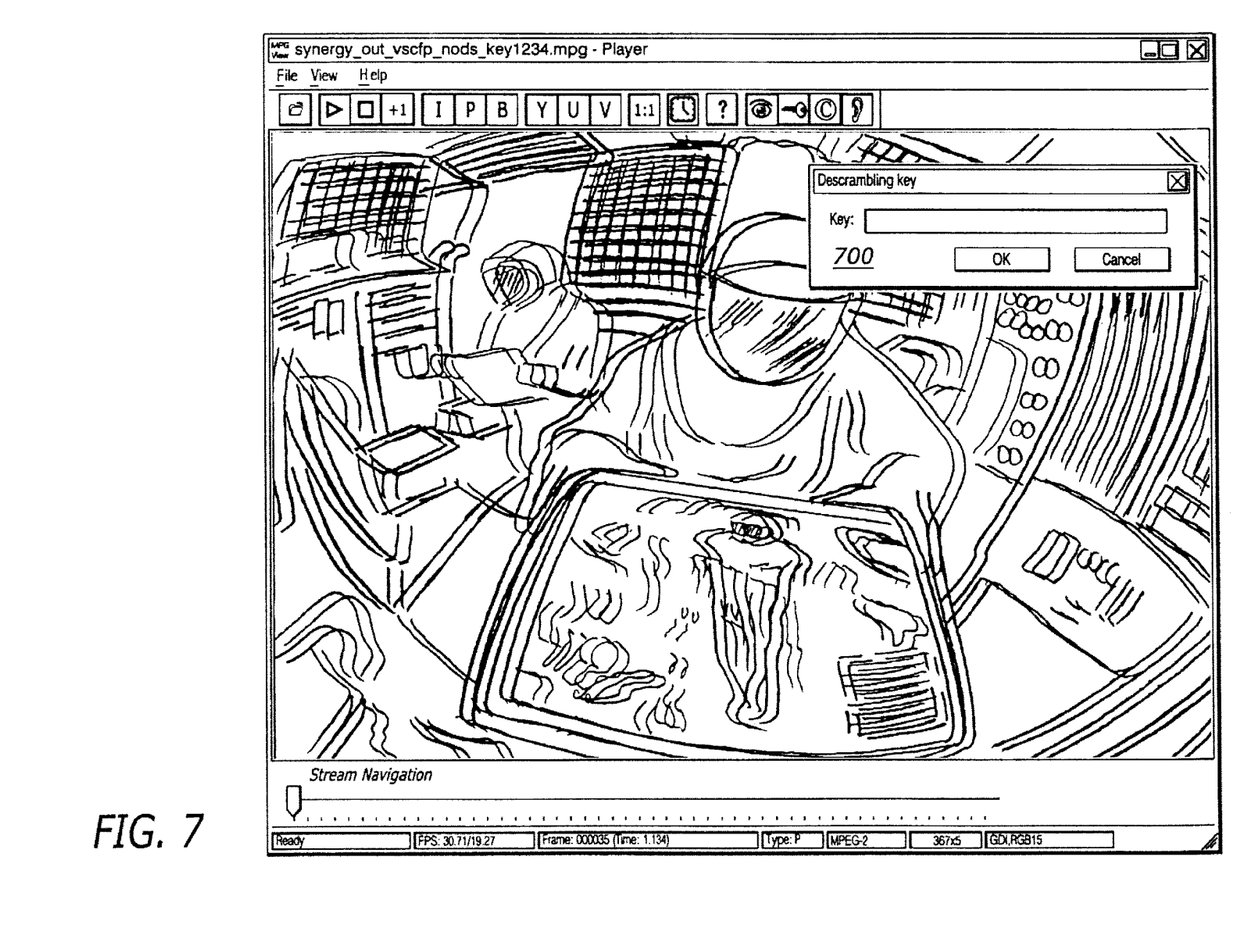
FIG. 7 is an embodiment of a screen display featuring a user identification window that prompting input of user information before removing visual degradation from the digital content.

If none of the key(s) are able to decrypt the delivered content 290 (e.g., video), client platform 120 generates a warning window 500 for display on display monitor 490 of client platform 120 as shown in FIG. 5. Window 500 indicates that either (i) the content is in an invalid format or (ii) no key for decrypting content 290 has been found. In the event that the key for decryption (key 471) is properly generated but a key to visually descramble content 290 (key 472) cannot be properly generated, a lesser quality of content 290 is played back as shown in FIG. 6. In the event that both keys 471 and 472 are properly generated, full-quality playback of the content is available. It is contemplated that if key 472 is based on a user information (e.g., a password, account number, etc.), client platform 120 may decrypt content 290 and generate a window 700 prompting the content purchaser to enter the user information as shown in FIG. 7. Once the user information is entered, the transformation of the delivered content can be completed. If the user information is incorrect, the lesser quality content will be played back. Otherwise, the full-quality content is played back.

The descrambled and decrypted data blocks are temporarily stored in a memory unit after decryption and/or descrambling operations are performed for displaying content in the data blocks. However, a substantial portion or the entire content need not be decrypted or descrambled and stored on permanent storage for the content to be played. This increases the difficulty to sabotage content.

For illustration sake, presume a situation where key 251 used at server platform 110 (see FIG. 2) is a mapping of the client identifier (e.g., a the processor identifier) of a requesting client platform while key 252 is the mapping of the recipient identifier provided from the requesting client platform. At a first level of access control, CPU_ID 150 is provided as input to mapping function 460 in order to generate key 471. If the processor identifier provided to server platform 110 of FIG. 1 is equivalent to CPU_ID 150, data descrambling mechanism 420 is capable of decrypting content 290 when provided key 471. Since the decrypted content is in a format for playback, the lesser quality content is provided to content player 450.

At a second level of access control, a recipient identifier is input into mapping function 460 in order to generate key 472. If the recipient identifier provided to server platform 110 of FIG. 1 is equivalent to REC_ID, key 472 may be used by visual/perceptual descrambling mechanism 430 to eliminate distortion of content 290 and provide full-quality content to content player 450 for playback. However, if the recipient identifier differs from REC_ID, the degraded quality content is played back. This is because a key cannot be properly generated to visually descramble the delivered video or image or to perceptively descramble the delivered audio. Of course, as an alternative embodiment, the first and second levels of authentication can be based on auxiliary information and the CPU_ID, respectively. Alternatively, keys 471 and 472 can be identical keys hashed from a combination of CPU_ID and REC_ID.

Figure 8:
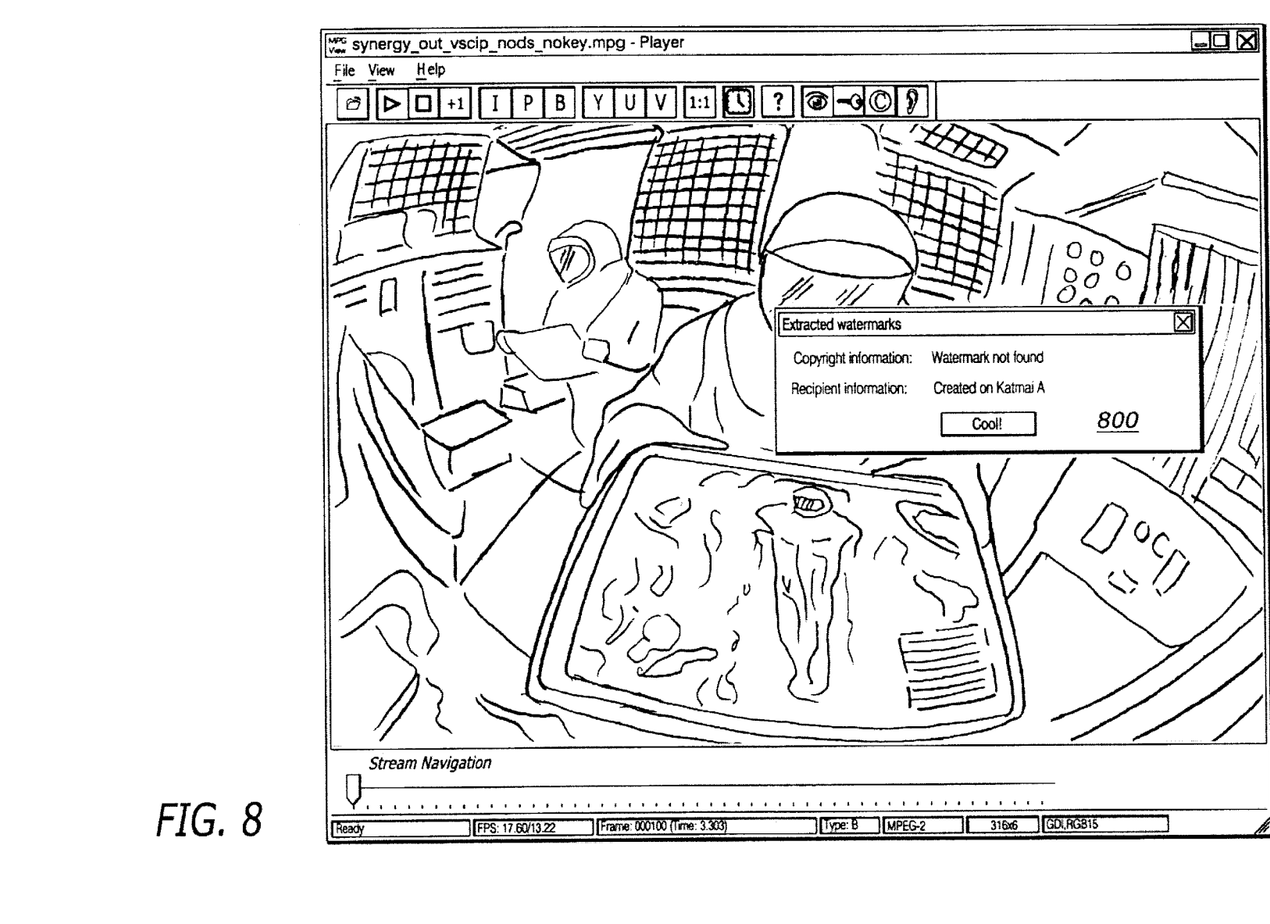
FIG. 8 is an embodiment of a screen display featuring a fingerprinting menu to provide ownership information concerning the digital content prior to playback on the content client platform.

As an option, watermark extraction mechanism 440 may be used to extract a watermark from content 290. The watermark may include (1) specific information pertaining to server platform 110, (2) ownership data, (3) data that identifies the targeted recipient (e.g., REC_ID), (4) data that identifies the control mechanisms of content at client platform (e.g., COPY, NO_COPY, etc.) and the like. The ownership data may be used to identify the owner of content 290, and to perform copy control in platforms that detect a watermark first and monitor the number of times content is played back. In one embodiment, as shown in FIG. 8, a fingerprinting window 800 is generated by client platform 120 to provide ownership/recipient information concerning the content prior to playback.

The hardware authentication check performed at client platform 120 can be executed repeatedly throughout playback of segments of content 290. The authentication check can be performed at regular intervals or at random intervals set by a random number generator. For video, the authentication check occurs every few frames or every few seconds. The key(s) 470 may be stored in tamper-resistant software to increase the difficulty for an attacker to obtain the key information. Tamper-resistant software is a secure way of executing macrocode by structuring the codes differently each time the same function is executed.

It is contemplated that it is not necessary for a connection to be maintained with the server platform during playback. Also, the content protection mechanisms of the server platform and the client platform may be placed within a single platform. This platform would have both content providing and playback capabilities. Thus, both content and privacy protection can be achieved.

Figure 9:
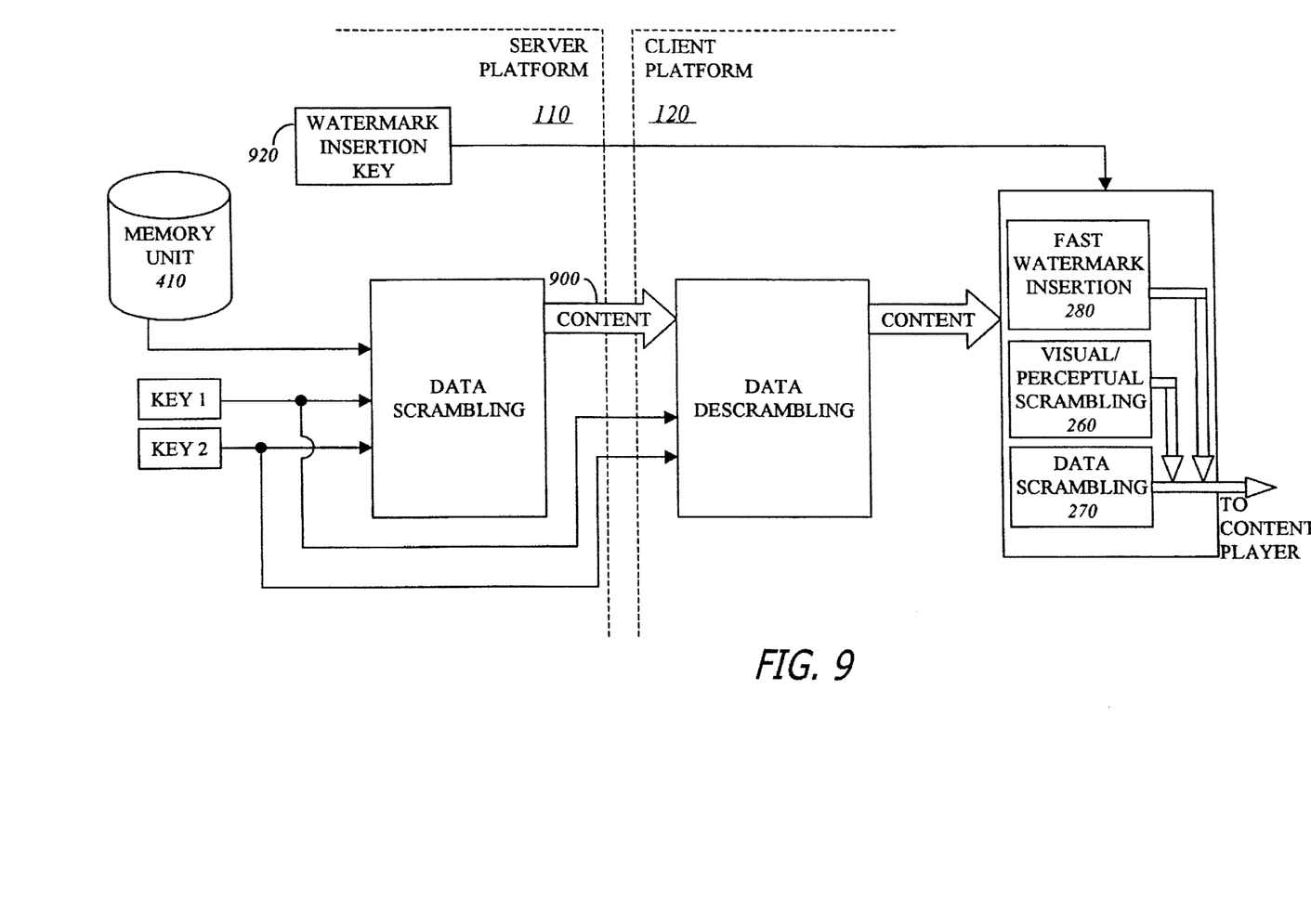
FIG. 9 is an illustrative block diagram of a second embodiment of the content distribution system of FIG. 1.

Referring to FIG. 9, a second embodiment of content distribution system 100 of FIG. 1 is shown. When multiple client platforms are scheduled to receive the same content from server platform 110, it may sometimes be computationally infeasible for server platform 110 to (i) individually watermark content 900 with each appropriate recipient ID (e.g., to "fingerprint" the data) or (ii) parse the compressed content in order to compute each visually scrambled version.

In this situation, copies of content can be transmitted to each client platform (or an intermediary module) without undergoing fingerprinting or visual/perceptual scrambling operations. As shown, client platform 120 would be responsible for inserting a correct recipient ID in a copy of received content 900 and computing a distorted version of content 900, prior to its viewing or storage. In this scenario, server platform 110 is responsible for communicating a watermark insertion key 920 and content 900 to be watermarked to secure watermark insertion scheme 280 on client platform 120. Thereafter, fast watermark insertion scheme 280 is exactly as would be performed in server platform 110 with watermark insertion key 920 being discarded after use. The visual/perceptual scrambling process 270 is also identical to the above-identified scheme described in FIG. 2. Content 900 and watermark insertion key 920 can optionally be encrypted prior to transmission, in which case client platform 120 is responsible for decrypting and subsequently re-encrypting content 900 prior to storage or other use.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A content distribution system comprising:
   a server platform including a memory unit to store digital content and access control logic to activate a plurality of content protection mechanisms to provide multiple levels of access protection to the digital content, a first content protection mechanism includes data scrambling of the digital content and a second content protection mechanism includes visual or perceptual scrambling of the digital content so that a quality of the digital content is intentionally degraded to a level substantially inferior to an original quality of the digital content; and
   a client platform in communication with the server platform, the client platform to playback segments of the digital content at one of a plurality of quality levels.

2. The content distribution system of claim 1, wherein the client platform includes a chipset having a secure platform signature acting as an identifier to distinguish the client platform from other platforms in communication with the server platform.

3. The content distribution system of claim 1, wherein the client platform includes a processor having a serial number acting as an identifier when provided to the server platform to distinguish the client platform from other platforms in communication with the server platform.

4. The content distribution system of claim 3, wherein the serial number is unique.

5. The content distribution system of claim 1, wherein a third content protection mechanism includes robust watermark insertion by embedding meta-data into the digital content.

6. The content distribution system of claim 5, wherein the server platform includes a compression unit and a decompression unit to assist in performing the robust watermark insertion in a spatial domain by decompressing the digital content before embedding the meta-data and compressing the digital content thereafter.

7. The content distribution system of claim 5, wherein a fourth content protection mechanism includes fast watermark insertion by embedding data identifying a targeted recipient into the digital content.

8. A server platform comprising:
   a memory unit to store digital content; and
   access control logic to activate (i) a first protection mechanism to provide multiple levels of access protection to the digital content, the first content protection mechanism includes data scrambling of the digital content to enhance protection of the digital content, and (ii) a second content protection mechanism to visually or perceptually scramble the digital content so that a quality of the digital content is intentionally degraded to a level substantially inferior to an original quality of the digital content.

9. The server platform of claim 8, wherein the first and second content protection mechanisms are performed based on at least one key generated from an incoming client identifier.

10. The server platform of claim 8, wherein the at least one key used by the first and second content protection mechanisms is further generated based on incoming client-based information provided with a client identifier.

11. The server platform of claim 8, wherein the incoming client-based information includes an identification of a targeted recipient of the digital content.

12. The server platform of claim 8, wherein the access control logic further activates a third content protection mechanism to increase protection of the digital content through fast watermark insertion by embedding data identifying a targeted recipient into the digital content.

13. The server platform of claim 8 further comprising circuitry to formulate an identifier based on at least one request from a client platform.

14. A client platform comprising:
   a processor having a serial number acting as an identifier to distinguish the client platform from other platforms during communication with a remotely located platform; and a communication device coupled to the processor, the communication device providing communications with the remotely located platform to receive incoming digital content; and access control logic to activate a first content protection mechanism to decrypt the incoming digital content and a second content protection mechanism to visually or perceptually descramble the digital content in an attempt to enhance a quality of the digital content during playback.

15. The client platform of claim 14 further comprising a content player to playback the digital content.

16. The client platform of claim 15 further comprising logic to activate a first content protection mechanism to encrypt the digital content and a second content protection mechanism to visually or perceptually scramble the digital content in an attempt to degrade a quality of the digital content before propagation to the content player.

17. A computer program embodied in a computer-readable medium and executable by a server platform for protecting content for unauthorized observation or manipulation, the computer program comprising:

a data scrambling function to encrypt the digital signal prior to transmission;

a visual scrambling function to intentionally degrade a visual quality of the digital signal;

a fast watermarking fiction to embed data to identify a targeted recipient of the digital signal without effecting the visual quality of the digital signal.

18. The computer program of claim 17, wherein the visual scrambling function operates prior to the data scrambling function.

19. The computer program of claim 17, wherein the visual scrambling function operates simultaneously with the data scrambling function.

20. The computer program of claim 17, wherein the first watermarking function operates prior to the visual scrambling function.

21. A method comprising:

receiving information to identify a destination of digital content;

performing an authentication check using the information in order to determine that the destination is authorized to receive the digital content;

performing visual scrambling operations to intentionally degrade a perceived quality of the digital content;

performing data scrambling operations to encrypt the digital content; and transmitting the digital content to the destination.

22. The method of claim 21, wherein the information to identify the destination includes a serial number of a processor implemented in a client platform being the destination.

23. The method of claim 21, wherein the information to identify the destination includes an identification of a targeted recipient requesting the digital content.

24. The method of claim 21, wherein prior to transmitting the digital content, the method comprises performing fast watermark insertion operations to embed data within the digital content to identify a targeted recipient of the digital content.

* * * * *